June 12, 1951

D. P. GRAHAM 2,556,730

PROCESS OF PRODUCING TINCTORIALLY STABLE
PHTHALOCYANINE COLORING MATTERS

Filed Oct. 19, 1949

INVENTOR.
Donald Penrose Graham
BY David Katz,
ATTORNEY

Patented June 12, 1951

2,556,730

UNITED STATES PATENT OFFICE 2,556,730

PROCESS OF PRODUCING TINCTORIALLY STABLE PHTHALOCYANINE COLORING MATTERS

Donald Penrose Graham, Lindamere, Del., assignor to E. I. du Pont de Nemours & Company, Wilmington, Del., a corporation of Delaware Application October 19, 1949, Serial No. 122,222

6 Claims. (Cl. 260—314.5)

This application is a continuation-in-part of my copending application Serial No. 79,894, filed March 5, 1949.

This invention relates to a process for producing phthalocyanine coloring matters in a finely divided, solid state, characterized by high tinctorial strength and by tinctorial stability when incorporated into vehicles containing aromatic liquids. More particularly, this invention deals with an improved process for producing phthalocyanines in the so-called beta crystalline form in a sufficiently fine state of subdivision to be useful for incorporation into liquid coating compositions, such as paints, varnishes and printing inks.

For the sake of facilitating the discussion, I shall take up particularly the properties of copper-phthalocyanine, without however any intent to limit this invention thereby.

Figure 1:
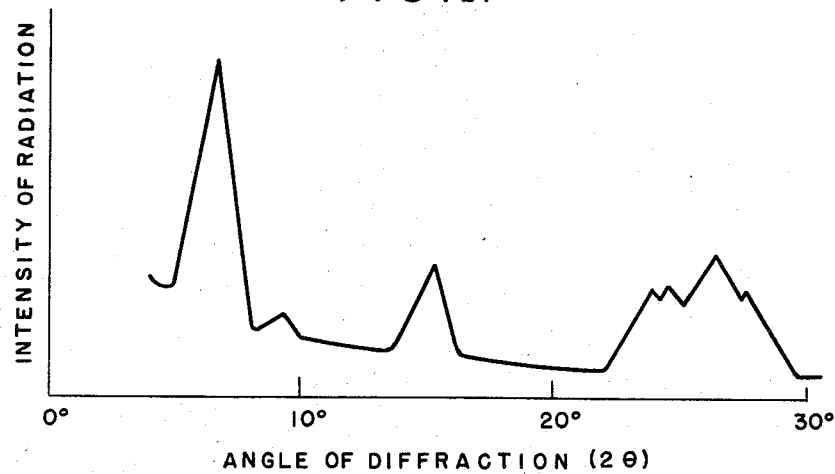
Figure 2:
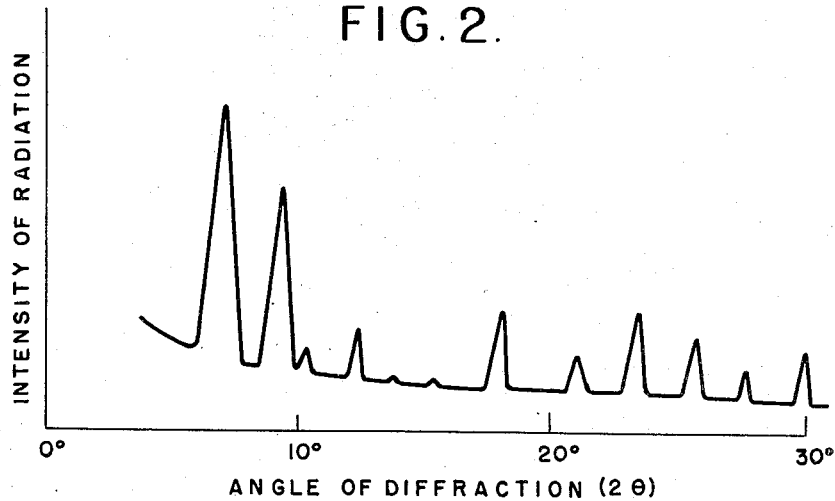

Copper-phthalocyanine exists in two crystalline forms which have been designated in the art as the alpha and beta modifications. The beta modification was first described (without naming it so) by J. M. Robertson in the Journal of the Chemical Society, 1935, page 615. The existence of the alpha modification was recognized later. Summarized descriptions of the two crystal modifications, and their influence on the physical and tinctorial properties of copper-phthalocyanine may be found in FIAT Final Report No. 1313, PB No. 85,172, vol. III, pages 446–448. These two modifications are most clearly characterized by their X-ray diffraction patterns, which are so different that it is not only possible to recognize qualitatively the crystal modification of a given sample, but also to estimate quantitatively the relative amounts of the two types in mixtures. For purposes of clearer understanding, reference is made to the accompanying drawing which depicts the X-ray diffraction patterns of copper-phthalocyanine, as determined by bombardment of powder samples of the pigments with the K$\alpha$ radiation of a copper target. Figure 1 relates to the alpha form; Figure 2, to the beta form.

The alpha and beta modifications of copper-phthalocyanine exist at two different energy levels, the alpha form having more energy bound in its crystalline structure than the beta modification. As a result, the alpha form is metastable with respect to the beta, and tends to revert to the more stable form. Thus, the alpha modification is transformed spontaneously and rapidly into the beta form when heated over 300° C. Reversion of the alpha form to the beta form also occurs when the pigment in the alpha form is exposed to any of a wide variety of organic liquids. Although, from the technical point of view, copper-phthalocyanine is considered insoluble in organic liquids, most such liquids have a sufficient solvent action on the alpha form to produce a solution saturated with respect to the beta form. The effect of this is to continuously dissolve the alpha form and transform it into crystals of the beta form, until substantially the entire pigment has been transformed.

Furthermore, in this transformation there seems to be a strong tendency for the beta crystals to grow in size. Large crystals on the other hand are the antithesis of tinctorial strength. Consequently, when a finely divided, high-tinctorial-quality, alpha copper-phthalocyanine (produced for instance by "acid-pasting") is put into contact with an aromatic liquid, it is slowly transformed into the beta form with an attendant loss of tinctorial strength. If the system is heated, the transformation takes place much faster. All of this constitutes a highly unfortunate property from the practical viewpoint, inasmuch as many organic liquids which have a solvent action on the alpha form of copper-phthalocyanine are commonly used as thinners or diluents in surface coating compositions in which the color is employed as a pigment. Under such conditions, the pigment may lose much of its original tinctorial strength in the storage period between the preparation of the composition and its final use.

Crude copper-phthalocyanine is usually (although not always) isolated in its beta modification from the reaction mixtures in which it is produced. As has already been stated, the beta modification may also be produced by transition from the alpha form by the action of heat or solvents. However, most environments which are favorable for the formation of the beta modification are also favorable for crystal growth unless special precautions are taken. As a result, the minimum particle size of the beta modification of copper-phthalocyanine is seldom less than 10 microns, and may be as high as 50 microns.

If copper-phthalocyanine is to be used as a pigment, its ultimate particle size must be extremely small, regardless of its crystal form. Therefore, the particle size of crude copper-phthalocyanine must be greatly reduced before it can be used successfully as a pigment. Ordinary methods of particle size reduction, such as conventional dry or wet ball milling, micropulverization or micronization, have proved to be incapable of producing this degree of subdivision.

Precipitation of copper-phthalocyanine from its solution in sulfuric acid (the so-called "acid-pasting" process) invariably produces the alpha form. Grinding beta copper-phthalocyanine with salt according to U. S. Patent No. 2,402,167, followed by extraction with water, likewise produces the alpha form.

I have now found that copper-phthalocyanine in beta form and in extremely fine state of subdivision, which I shall hereinafter designate as the pigmentary state because of its suitability for use as pigment in paints and printing inks, may be produced by subjecting copper-phthalocyanine, either in alpha or in beta form to salt-milling, essentially according to said U. S. Patent No. 2,402,167, but with this modification that the milling is effected in the presence of a small quantity of a liquid aromatic hydrocarbon which has a limited solvent action on copper-phthalocyanine, as manifested by its ability to transform the alpha form of this color into the beta form. As practical examples of such liquids may be named toluene, the xylenes, ethyl-benzene, cymene, tetraline and other liquid alkylated benzenes having not more than 10 carbons atoms and boiling between 110° and 210° C., as well as mixtures of any of the above.

By small quantity hereinabove, I mean a quantity insufficient to convert the salt-pigment mix into a doughy mass. More exactly, the quantity of liquid found by me necessary or desirable is from 5 to 50% by weight based on the weight of the pigment. The quantity of salt may vary, as in said U. S. patent from 4 to 20 times the weight of the pigment. The apparatus employed is preferably a ball mill, and all other details of length of grinding, speed of rotation, etc. may follow the details set forth in said patent.

I find to my surprise that if such procedure of grinding with salt and organic liquid is employed, followed by extraction of the salt with water, the pigment is obtained almost exclusively in the beta form; furthermore, the solvent may be removed by vacuum distillation or even steam distillation, without causing the particles to grow in size. The result is a finely divided copper-phthalocyanine of extremely high tinctorial strength and of very high stability, as to crystal growth or loss of tinctorial strength, in aromatic solvents. Moreover, the blue shade of this pigment is shifted markedly toward the green compared to the shade of acid-pasted copper-phthalocyanine (alpha form), which in effect offers to the market a new color in the phthalocyanine series. The tinctorial strength of the product is not altered by boiling for 1 hour in xylene (a very severe test) or by prolonged storage in paints, lacquers, printing inks or textile printing compositions in which aromatic solvents are used as diluents or thinners.

The pigment obtained according to this invention possesses a relatively narrow range of particle size distribution, the size being generally less than 0.2 micron and mostly in the limits of 0.01 to 0.1 micron. The extreme fineness of this size will be appreciated when it is recalled that present commercial standards of acid-pasted copper-phthalocyanine (alpha form) have a particle size predominantly between 0.05 micron and 1 micron. When tested in paints or lacquer systems, the product of this invention is considerably more resistant to flocculation and has less tendency to settle out than the pigment produced from the same crude by acid-pasting methods.

Without limiting my invention, the following examples are given to illustrate my preferred mode of operation. Parts mentioned are by weight.

Example 1

A mixture of 20 grams of crude copper-phthalocyanine (beta modification), 180 grams of dry sodium chloride and 2.0 grams of xylene was charged into a quart, friction-top, tin can containing 1800 grams of ⅜" steel balls. The can was rotated at 70 to 75 revolutions per minute for 72 hours. At the end of this time, the ground mixture of pigment and salt was separated by screening from the steel balls, and the salt was removed from the pigment by extraction with 800 grams of 2% sulfuric acid solution at 90 to 95° C. for 1 hour. The charge was then filtered and the cake was washed acid-free and dried at 60° C.

The product was a soft powder almost exclusively in the beta crystalline form, and more than 90% of its particles were in the size-range of about 0.01 to 0.1 micron (as indicated by electron micrograph). Its strength, judged as a printing ink pigment, was approximately equal to that of the acid-pasted material prepared from the same crude; this tinctorial strength was not altered after heating for 1 hour in boiling xylene. When incorporated in paints or lacquers, the pigment exhibited much less tendency to flocculate than a pigment prepared by acid-pasting the same crude material.

To test further the stability of the above product in paints and lacquers against crystallization, and by way of a double-check on the boiling xylene test, the product of this example was incorporated, together with a yellow pigment, into a standard paint vehicle containing 33% of toluene by weight, to produce a green paint. Simultaneously, another paint sample was prepared from the same ingredients and in the same proportions, except that the alpha form of copper-phthalocyanine (i. e. acid-pasted material) was employed in lieu of the product of this example as blue component. The two paints were allowed to stand for 21 days at 50° C., whereupon it was found that the paint employing the subdivided beta form of Example 1 hereinabove did not change perceptibly in color, whereas in the sample employing the alpha form, the blue shade faded out completely, leaving behind a yellow paint.

The xylene employed in the above example was a commercial mixture known as "3-degree xylene." It boils within the range of 137 to 140° C., and its constitution is essentially as follows:

| | Per cent |
|---|---|
| Meta-xylene | 55 to 65 |
| Ortho-xylene | 15 to 20 |
| Para-xylene | 15 to 20 |
| Ethyl-benzene | 5 to 10 |
| Toluene | 1 to 3 |

But it will be clear that any other commercial grade of xylene or any isolated constituent thereof may be employed with equal success.

Example 2

A steel ball mill of 1.7 gallons capacity was charged with 14,500 grams of ⅞" steel balls, 726 grams of dry sodium chloride, 81 grams of the beta modification of crude chlorine-free copper-phthalocyanine, and 12 cubic centimeters of tetrahydro naphthalene. The air in the mill was replaced by carbon dioxide gas. The mill and its contents were then rotated at 88 revolutions per minute for 30 hours. At the end of this time, the ground product was separated from the balls and extracted for 1 hour in 7 liters of boiling 4% sulfuric acid. The suspension was filtered; the product was washed acid-free and dried in a humidified oven at 60° C.

The product exhibited a typical beta X-ray diffraction pattern. When tested as a printing ink, it was equal in tinctorial strength to the soft powder obtained by acid pasting the same crude material, and its tinctorial strength was not altered by 1 hour's exposure to boiling xylene.

It will be understood that the mode of procedure is capable of wide variation, without departing from the spirit of this invention. Thus, although the above description talks specifically of copper-phthalocyanine, the same invention may be applied with similar beneficial results to metal-free phthalocyanine, or any other metal-phthalocyanine which is capable of existing in two crystalline forms and which has a tendency to grow large crystals when in contact with aromatic solvents for instance, nickel-phthalocyanine. This point is illustrated by the following additional example:

*Example 3*

A quart tin can of the press-top kind was charged with 1800 grams steel balls of $3/4''$ diameter, 180 grams of dry salt, 20 grams of chlorine-free nickel-phthalocyanine (mixture of $\alpha$ and $\beta$ forms) and 3 cc. of xylene. After milling for 72 hours at 72 R. P. M., the pigment-salt mixture was separated from the steel balls, the xylene was removed by steaming in 1 liter of water, and the pigment was subsequently extracted at 70° C. for 1.5 hours with 2% hydrochloric acid in order to remove iron. After filtration the pigment was washed acid-free and dried in a humidity drier at 60° C.

The product represented the beta form of nickel- phthalocyanine, the particles of which could not be seen in an optical microscope. This pigment yielded greenish-blue inks.

It is a peculiar but well known characteristic of the phthalocyanine coloring matters that those phthalocyanines which have a significant amount of chlorine in the nucleus do not have the mentioned tendency to grow crystals in aromatic solvents. Therefore, although such chorinated phthalocyanines may be subjected to good advantage to salt-grinding under the conditions of this invention, the invention is of grave importance only in conjunction with chlorine-free phthalocyanines, by which phrase I mean to include substantially chlorine-free copper-phthalocyanine, metal-free phthalocyanine, and phthalocyanines of metals other than copper; and these may be initially either the alpha form or the beta form and in either crude or refined state.

As concerns the organic liquid to be employed, I already mentioned that its primary qualification is that it shall have a limited solvent action upon the alpha form of copper-phthalocyanine, as manifested by its ability to transform the alpha form into the beta form. A simple test for this quality is to heat the alpha form of copper-phthalocyanine (obtained by acid-pasting) for one hour in the liquid in question at its boiling point, or at 150° C. if the boiling point is higher than 150° C. If the product is transformed entirely into the beta modification (as determined by the X-ray diffraction pattern), the liquid in question is suitable for the purpose of this invention.

Following this primary qualification, various secondary qualifications may be imposed upon the liquid to be chosen from various practical viewpoints. For instance, it is preferable to use a liquid which is easily separated by distillation. From this viewpoint, a low boiling liqud (say, one boiling below 150° C.) is to be preferred. Economic availability and cost may also come into consideration.

The novel pigmentary metal-phthalocyanines hereinabove referred to are further described and claimed on their own merits in copending application of Frank W. Lane, Serial No. 79,902, of March 5, 1949.

Pigmentary beta metal-free phthalocyanine, obtainable according to this invention, is claimed as a new product in copending application of Otto Stallmann, Serial No. 79,915, of March 5, 1949.

I claim as my invention:

1. A process for producing a chlorine-free phthalocyanine pigment in a finely divided physical form characterized by tinctorial stability in aromatic solvents, which comprises subjecting a crude chlorine-free phthalocyanine in beta form to salt-milling in the presence of a liquid aromatic hydrocarbon which is characterized by its ability to transform the alpha form of phthalocyanine pigments into the beta form, the quantity of said organic liquid being not greater than 0.5 part by weight for each part by weight of said phthalocyanine pigment.

2. A process as in claim 1, followed by extraction of the milled mass with dilute aqueous acid to remove the salt and the organic liquid.

3. A process as in claim 2, followed by drying the residual pigment.

4. A process for producing copper-phthalocyanine in a finely divided physical form characterized by tinctorial stability in xylene, which comprises subjecting the crude, beta form of the color to salt-milling in the presence of a liquid aromatic hydrocarbon which boils below 212° C., the quantity of said organic liquid being from 5% to 50% by weight based on the weight of said copper-phthalocyanine.

5. A process as in claim 4, the liquid aromatic hydrocarbon being an alkylated benzene of not more than 10 carbon atoms.

6. A process as in claim 4, the liquid aromatic hydrocarbon being xylene.

DONALD PENROSE GRAHAM.

REFERENCES CITED

The following references are of record in the file of this patent:

UNITED STATES PATENTS

| Number | Name | Date |
| --- | --- | --- |
| 2,486,304 | Loukomsky | Oct. 25, 1949 |

FOREIGN PATENTS

| Number | Country | Date |
| --- | --- | --- |
| 569,402 | Great Britain | May 22, 1945 |